(No Model.)
G. NEW & A. MITTELSTEADT.
INCUBATOR.
No. 509,389. Patented Nov. 28, 1893.
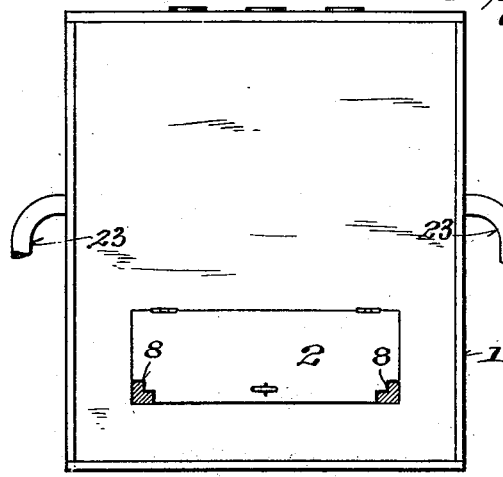
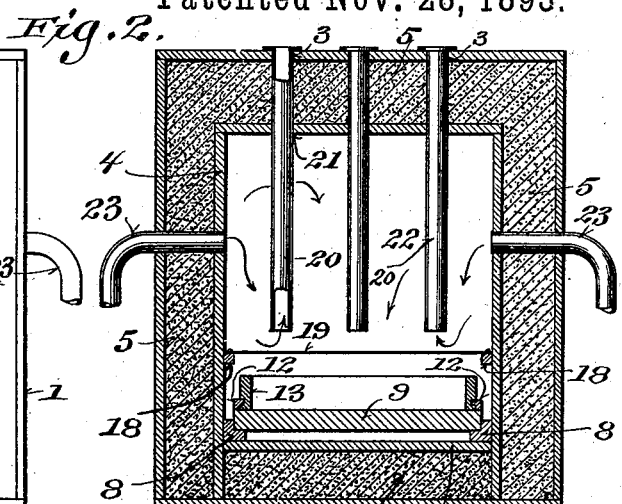
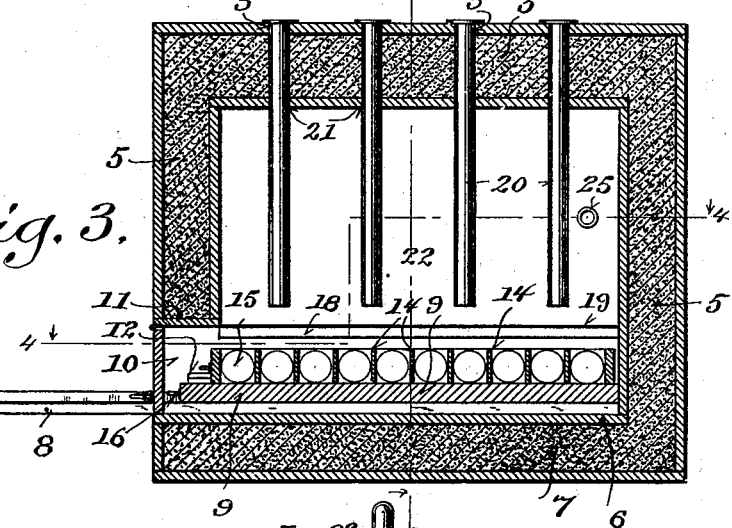
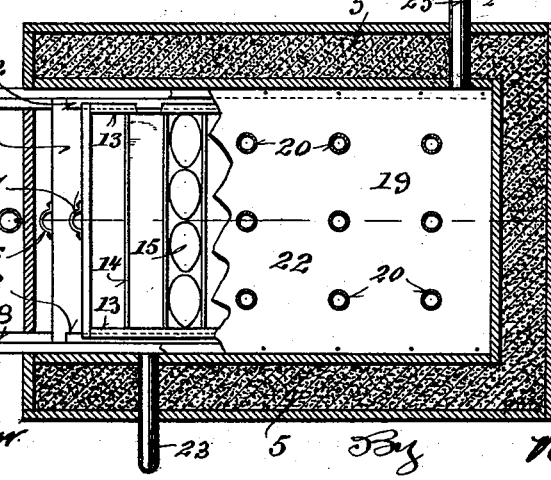

UNITED STATES PATENT OFFICE.

GEORGE NEW AND ALBERT MITTELSTEADT, OF MENOMINEE FALLS, WISCONSIN.

INCUBATOR.

SPECIFICATION forming part of Letters Patent No. 509,389, dated November 28, 1893.

Application filed August 10, 1893. Serial No. 482,810. (No model.)

*To all whom it may concern:*

Be it known that we, GEORGE NEW and ALBERT MITTELSTEADT, of Menominee Falls, in the county of Waukesha and State of Wisconsin, have invented a new and useful Improvement in Incubators, of which the following is a description, reference being had to the accompanying drawings, which are a part of this specification.

Our invention has relation to improvements in incubators.

The object of the invention is to provide an improved construction for hatching eggs by artificial means, which shall combine simplicity and general efficiency to the maximum.

With the above object in view, the invention consists in the improved construction and combination of parts hereinafter more fully set forth.

In the accompanying drawings, Figure 1, is a front elevation. Fig. 2, is a transverse vertical section on the line 2—2 of Fig. 3. Fig. 3, is a longitudinal vertical section on the line 3—3 of Fig. 4, and Fig. 4, is a horizontal section on the line 4—4 of Fig. 3.

Like numerals of reference denote like parts throughout the several views.

Referring to the drawings, the numeral 1 indicates an outer casing, said casing provided with an opening in its front, covered by a hinged door or lid 2, and having its top provided with a series of circular apertures 3.

The numeral 4 indicates an inner casing, the sides of which extend down below the end pieces, and rest upon the bottom of the outer casing. This inner casing is of such size as to leave a space 5, between the same and the sides, ends, and top of the outer casing, said space being filled with sawdust, as clearly shown in the drawings, which acts to retain the heat within the inner chamber, as will hereinafter more fully appear.

Suitably secured between the side pieces of the inner casing, above the bottom of the outer casing, is a horizontal partition or bottom piece 6, the space 7 beneath said partition being also filled with sawdust. Upon this partition are supported angular side cleats 8, 8, which form supports or guides for a sliding board 9, and extend out beyond the front of the casing, so that when the door or lid 2 is raised, the sliding board may be pulled out clear of the casing. To provide for this withdrawal of the board, the front of the inner casing has an opening 10. A small horizontal partition 11 also serves to support the sawdust in the front space 5. The board 9 has extending upward from its side edges longitudinal strips 12, 12, provided with inward-extending tongues, which fit in longitudinal recesses in the side pieces of a rectangular frame 13, which rests movably upon the board 9, said board forming a bottom for the same. This rectangular frame is provided with a series of transverse partitions 14, which subdivide the same into a series of compartments for the eggs 15, said eggs being arranged lengthwise in the compartments, as clearly shown. The bottom board 9, and the rectangular frame 13, are provided, respectively, with handles 16 and 17. When a pull is exerted on the handle of the bottom board, the entire tray is withdrawn, that is, the said bottom board and the rectangular frame resting thereon; whereas, when a pull is exerted on the handle of the rectangular frame, said frame alone is withdrawn and the bottom remains stationary. Upon the inner face of the side pieces of the casing 4 are secured, slightly above the egg tray, longitudinal cleats 18, 18, upon which is secured a partition 19, preferably of tin.

The numeral 20 indicates a series of draft pipes, which extend through the apertures 3 in the top of the outer casing, thence through the sawdust space between the tops of the respective casings, thence through apertures 21 in the top of the inner casing, and finally down into the inner hot air chamber 22, terminating slightly above the tin partition 19. This hot air chamber is fed by means of pipes 23, 23, which enter from the exterior the opposite sides of the outer casing, thence extend across the side sawdust spaces, and enter the opposite sides of the inner casing. These pipes may be supplied by means of lamps (not shown), or any other suitable source of supply.

In operation, the lid or door 2 is raised, and the entire tray withdrawn by a pull upon the handle 16. After the egg compartments have been filled, the tray is slid back in place, and the door or lid closed. Heat is next introduced into the hot air pipes 23, which of course rapidly fill the chamber 22 with the hot air. As there is a continued upward draft from said chamber, caused by the provision of the draft pipes 20, the hot air is necessarily drawn downward, thus coming in direct contact with the tin partition 19 and thoroughly heating the same the partition in turn thoroughly heating the egg tray below, after which said heated air passes to the exterior through the draft pipes.

During the time the eggs are undergoing the process of artificial hatching, it is frequently necessary to turn the same in their compartments, and it is for this reason that we provide the rectangular frame supported movably on the bottom board 9. By simply lifting the lid or door 2, and exerting a pull on the handle 17, the rectangular frame may be moved, and in this manner the eggs readily turned.

It will be seen that by the construction above described, a simple device for the purpose is provided, in which the heat within the heating chamber is more effectually retained against escape by the provision of the sawdust filled spaces completely surrounding said chamber. Furthermore, the structure permits of the convenient withdrawal of the tray for the purpose of filling the same, and an independent movement of the rectangular frame of the tray for the purpose of turning the eggs.

Having thus described our invention, what we claim, and desire to secure by Letters Patent, is—

1. In an incubator provided with an interior hot air chamber, the combination, of means for supplying heated air to said chamber, a heat retaining partition at a distance above the bottom of the hot air chamber, an egg carrying tray arranged in the space between the bottom of the chamber and the heat retaining partition, and pipes communicating at their upper ends with the exterior, and having their lower ends extending down to within close proximity to the heat retaining partition, the draft in said pipes causing the hot air to be drawn down to the heat retaining partition, and thence out through the pipes to the external air, substantially as set forth.

2. In an incubator, the combination, of an outer casing, provided with an opening in its front, said opening having a suitable cover, an interior casing having its sides extending below its ends and resting upon the bottom of the outer casing, said inner casing constituting an interior hot air chamber, a filling space being formed between the sides, ends, and tops, respectively, of the inner and outer casings, said inner casing also provided with an opening registering with the opening in the front of the outer casing, a horizontal partition to support the filling in the front filling space, a horizontal partition between the sides of the inner casing, said partition arranged above the bottom of the outer casing to form a lower filling space, and a sliding tray within the inner casing, substantially as set forth.

3. In an incubator, the combination, of a casing having an opening in its front, longitudinal strips secured to opposite sides of the casing and extending out through the opening a suitable distance, a sliding board resting on the longitudinal strips, and normally disposed within the casing, said board provided with guides or strips projecting from the same, and also with a handle at its front end, a frame provided with a suitable handle, said frame resting movably on the board, and guided by the strips thereof, and also formed with a series of egg compartments, and a lid or cover for the opening of the casing, provided with recesses fitting over the extended ends of the longitudinal strips, said cover when raised permitting the tray to be slid from the interior of the chamber onto the extended ends of the longitudinal strips, substantially as set forth.

In testimony whereof we affix our signatures in presence of two witnesses.

GEORGE NEW.
ALBERT MITTELSTEADT.

Witnesses:
L. B. McGAHA,
I. B. ROWELL.